United States Patent [19]

Lopatin et al.

[11] Patent Number: 5,384,845

[45] Date of Patent: Jan. 24, 1995

[54] COMMAND MODULATION SYSTEM HAVING COMMAND GENERATOR UNIT FOR COMMANDING A PLURALITY OF DIFFERENT TYPES OF CONTROLLED UNITS

[75] Inventors: Andrew J. Lopatin, Boyds, Md.; Antoine R. Naaman, Washington, D.C.; Jean-Pierre G. Bourgon, Herndon, Va.

[73] Assignee: International Telecommunications Satellite Organization, Washington, D.C.

[21] Appl. No.: 45,777

[22] Filed: Apr. 14, 1993

[51] Int. Cl.6 .............................................. H04K 1/02
[52] U.S. Cl. ................................. 380/9; 340/825.49; 379/60; 363/25
[58] Field of Search ................... 340/825.49; 379/60, 379/59; 380/59, 9; 363/25

[56] References Cited

U.S. PATENT DOCUMENTS 5,257,019  10/1993  Schwendeman et al. ...... 340/825.49
5,260,861  11/1993  Wert ......................................... 363/25
5,265,150  11/1993  Helmkamp et al. .................. 379/58

Primary Examiner—David C. Cain
Attorney, Agent, or Firm—Sughrue, Mion, Zinn, Macpeak & Seas

[57] ABSTRACT

A command modulation system receives commands from a plurality of input sources, some local and some remote, and routes the commands to a plurality of commanded devices, which may be satellites. By use of the input sources, a user configures digital signal processors located in each of a plurality of modulation channels so that the channels have the desired modulation parameters. In this way, the system can be made to command a plurality of different types of commanded devices.

15 Claims, 7 Drawing Sheets

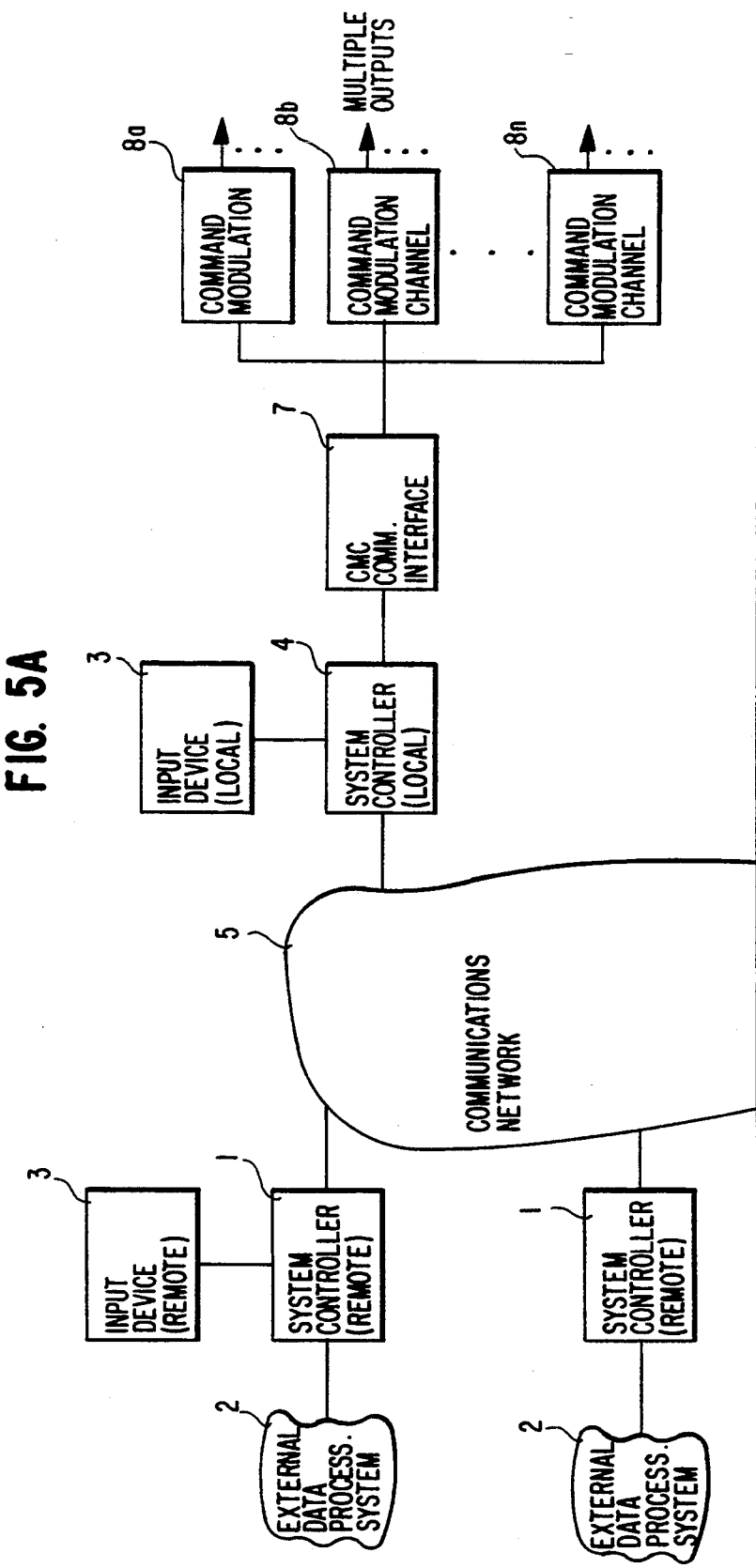

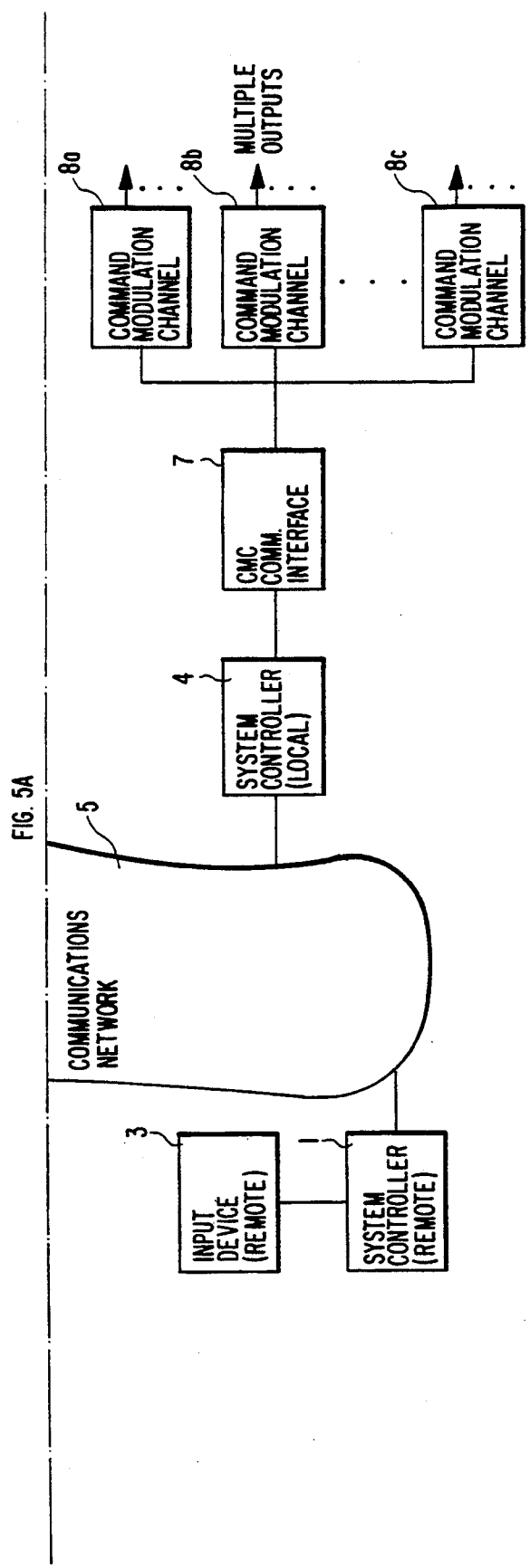

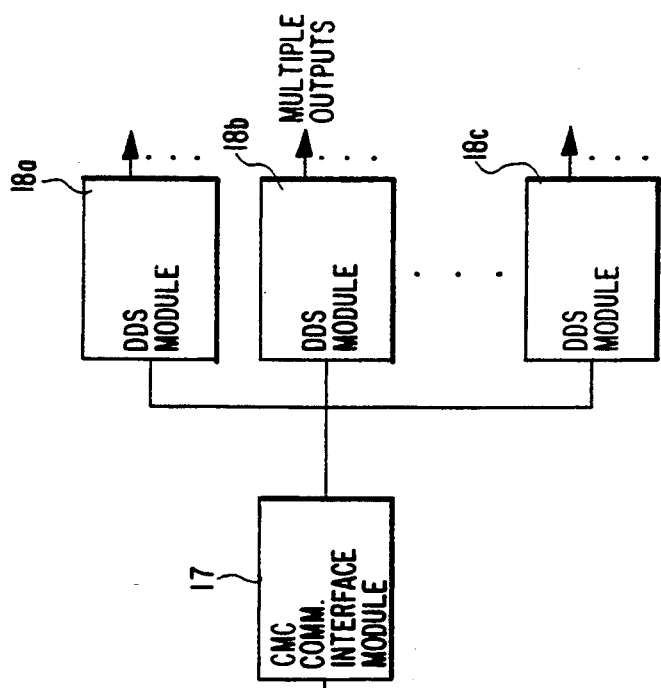
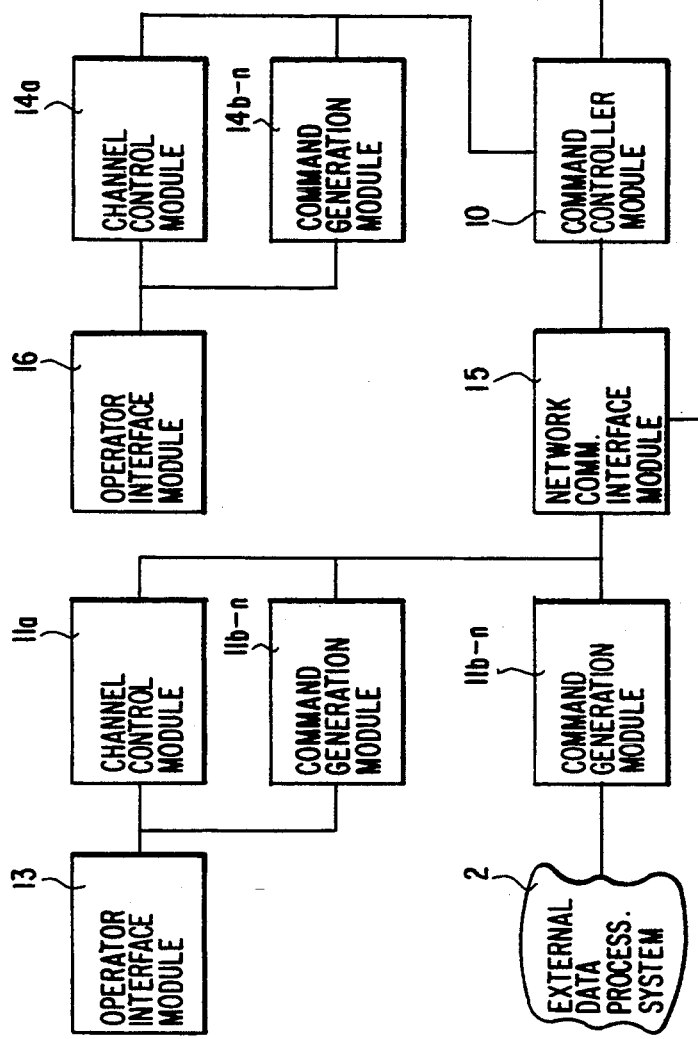

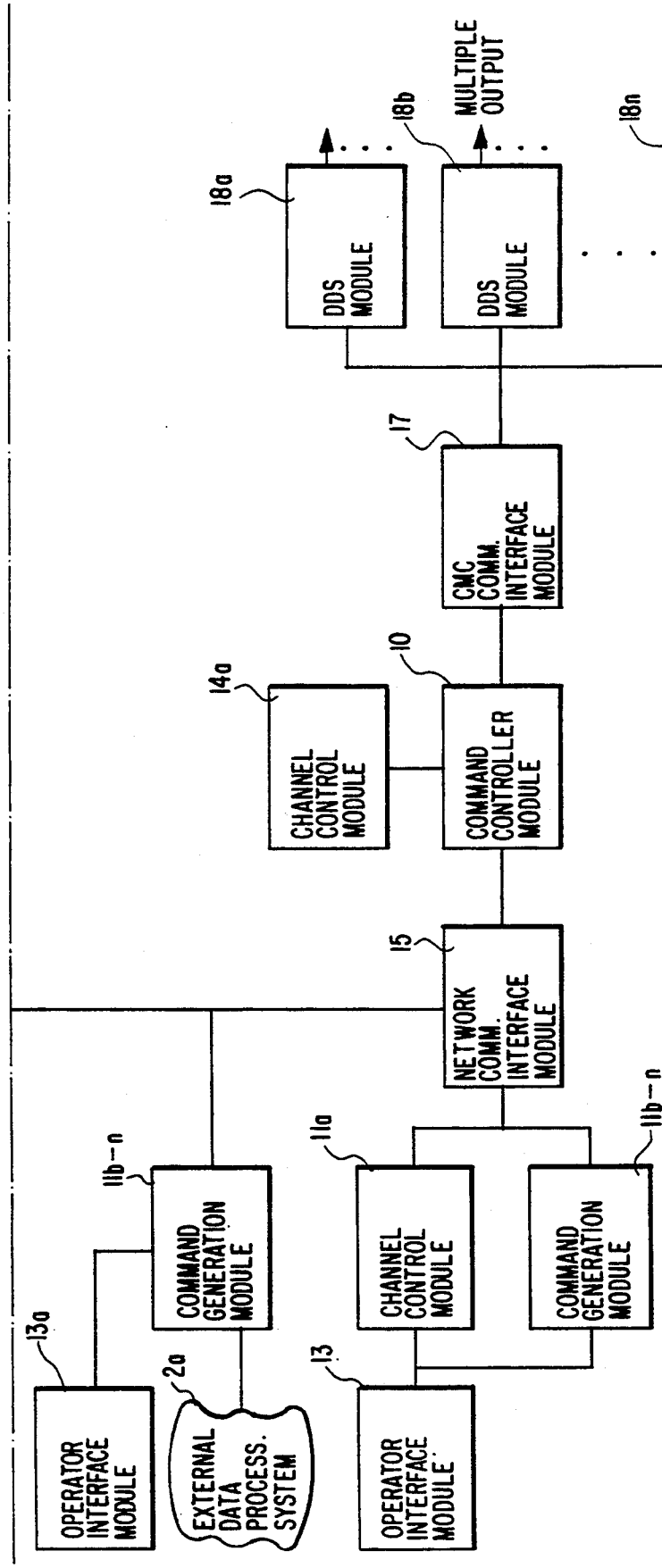
FIG. 6A | FIG. 6B

COMMAND MODULATION SYSTEM HAVING COMMAND GENERATOR UNIT FOR COMMANDING A PLURALITY OF DIFFERENT TYPES OF CONTROLLED UNITS

BACKGROUND OF THE INVENTION

The present invention relates to a command modulation system for generating commands to be sent to an external commanded device, for example, a satellite.

FIG. 1 illustrates the capabilities offered by typical existing command generator units. As shown in FIG. 1, the command generator unit 100 is arranged to receive inputs from a front panel interface and/or a computer interface link from an external data processing system 200. The hardware configuration of this conventional system consists of a microcomputer and peripheral processors housed in a single box of the command generator unit 100. Numeric keypads, control buttons and alphanumeric displays on the front panel make up the operator interface for local control, labelled front panel interface in FIG. 1. A serial interface port is used for computer control by an external processor 200, such an interface port being labelled computer interface link in FIG. 1. The parameters required to generate a command are either entered by an operator at the front panel or are received from the external data processing system 200. The commands originating from the external data processing system 200 may be stored in advance and then sent to the command generator unit 100 along the computer interface link. In accordance with the data received from the front panel or external data processing system, the command generator unit then generates the appropriate command sequences for transmission to the targeted system, e.g., a particular satellite.

The software used by the system of FIG. 1 is stored on a programmable ROM. This software processes the input from a local operator via the front panel controls, and/or the input from the external processor via the serial port. The software is written in assembly language and is very difficult to modify.

In addition, the command generator is custom designed to command only a specific type or types of known targeted system and can only produce a single type of output at a given time. This creates a problem in that, if plural known types of targeted systems are to be controlled simultaneously or new types of targeted systems are to be controlled, a respective number of command generators will be required.

SUMMARY OF THE INVENTION

It is an object of the present invention to provide a command modulation system having a command generator unit capable of providing simultaneous outputs to a plurality of different types of targeted systems.

It is further an object of the present invention to provide a command modulation system which has a high degree of flexibility for growth in adapting to new types of targeted systems at a relatively small cost.

In accordance with the present invention, a command modulation system includes one or more input devices, which may be local and/or remote devices, a command generator for generating commanding sequences for the controlled system(s) in accordance with command information from the input device(s), at least one command modulation channel for generating modulated command signals for transmission to the controlled system(s) in accordance with the command information and in accordance with channel parameters and a channel controller responsive to the command information for controlling at least one of the channel parameters.

The preferred embodiment of the command modulation system includes plural command modulation channels each for controlling a different targeted system. The user can assign a given channel to a given targeted system, configure the assigned channel such that its modulation parameters, e.g., modulation mode, tone frequencies, tone amplitudes and bit rate, are compatible with the system to be controlled, and then enter command sequences which have been generated for the targeted system and which are then modulated by the assigned command modulation channel and transmitted to the targeted system.

The input devices may be operator input devices, e.g., operator panels or keyboards, or external data processing systems, or both. They may also be local or remote systems, with the remote sources being coupled to a system controller which generates the appropriate commanding sequences and command parameters and forwards them to the command modulation channels.

The command modulation channels use inexpensive digital signal processing (DSP) circuitry for generating the command modulation waveforms. Encryption capability is also provided. Finally, each modulation channel may transmit user-defined spreading waveforms during idle commanding periods to disperse RF carrier energy to meet CCIR uplink power constraints.

In the preferred embodiment, the local command modulation system is implemented and housed in a single personal computing system (PC) such as an IBM PC with an INTEL 386 processor. It should be recognized, however, that alternative implementations could be utilized and may be preferable under the particular circumstances involved.

BRIEF DESCRIPTION OF THE DRAWINGS

The present invention will be now described in more detail, with reference to the accompanying drawings, in which:

FIG. 5 is a diagram showing an expanded hardware configuration of the command modulation system of this invention; and FIG. 6 is a diagram showing an expanded software configuration of the command modulation system of this invention.

DETAILED DESCRIPTION OF THE INVENTION

Figure 1:
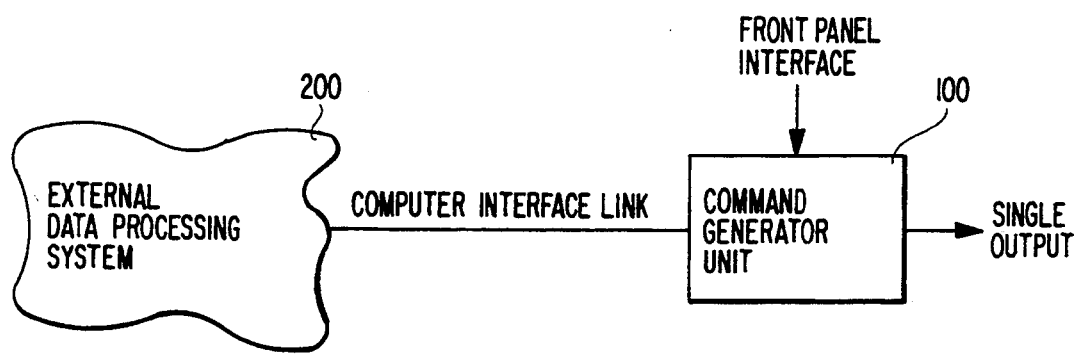
FIG. 1 is a diagram showing capabilities of existing command generator units.
Figure 2:
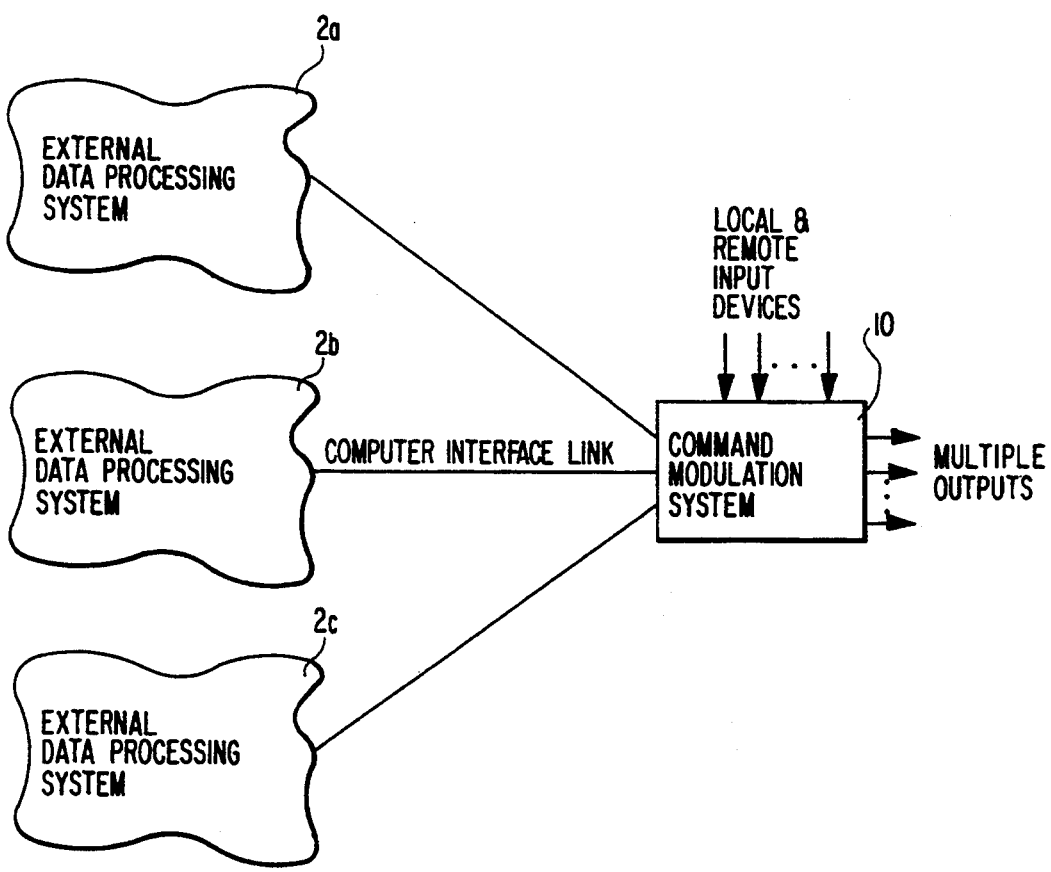
FIG. 2 is a diagram showing capabilities of the command modulation system of the present invention.

FIG. 2 is a diagram illustrating the general arrangement of the command modulation system of the present invention. Here, a command modulation system 10 is capable of receiving inputs from a plurality of external data processing systems 2a–2c, and is capable of providing a plurality of outputs simultaneously.

The preferred embodiment involves a distributed multi-processing architecture. It allows for multiple input sources for operator commanding from both local and remote devices. It provides interfaces to multiple external processing systems along computer interface links for computer controlled commanding. Its modular design is easily adaptable to different uses and may be used for simultaneously commanding different types of sophisticated systems requiring local or remote commanding capability.

The invention also provides flexibility for growth in adapting new types of targeted systems at a relatively low cost, i.e., by adding digital signal processing boards to the system and modifying existing software modules. It offers an inexpensive means of generating command modulation waveforms using digital signal processing technology. A single system is capable of simultaneously producing multiple outputs to command multiple types of commanded devices, for example, satellites.

The command modulation system 10 of FIG. 2 is modular in format and is integrated using a combination of hardware and software modules. These modules will be described below in conjunction with FIGS. 3 and 4 illustrating the basic system configuration.

Figure 3:
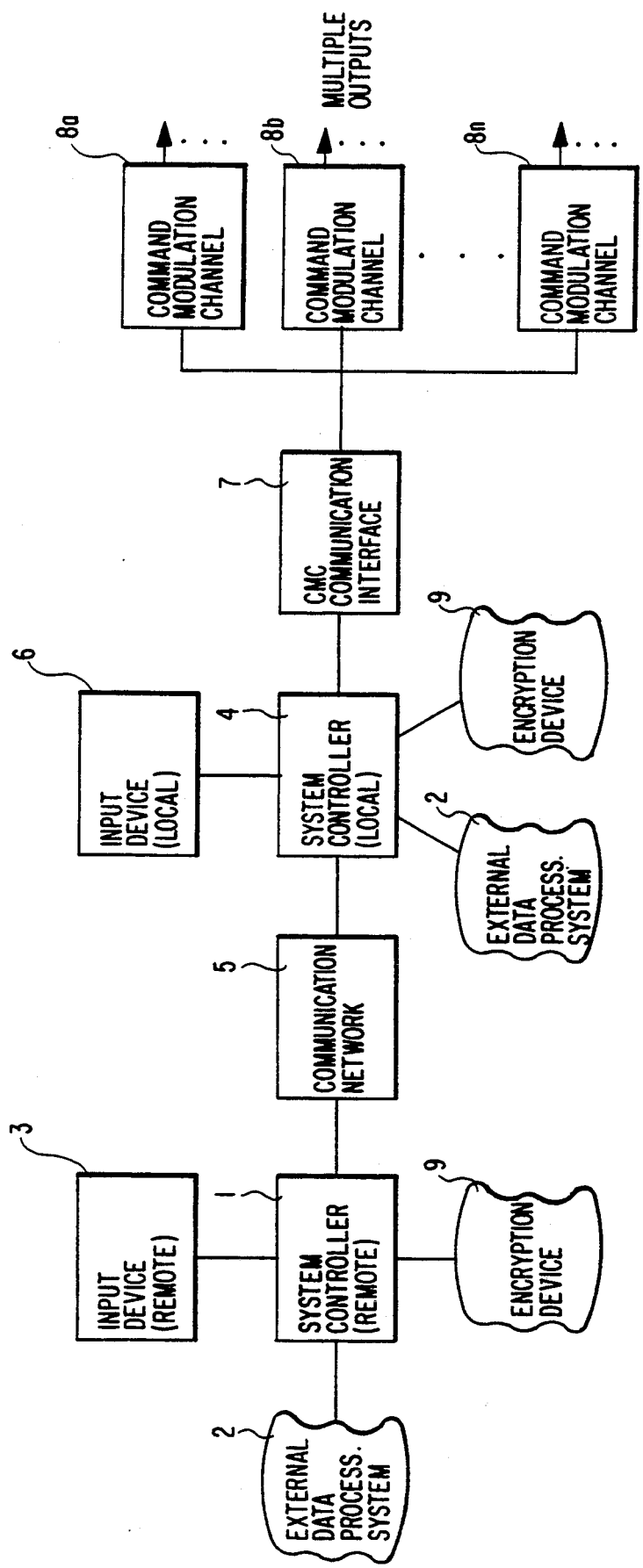
FIG. 3 is a diagram showing a basic hardware configuration of the command modulation system of this invention.
Figure 4:
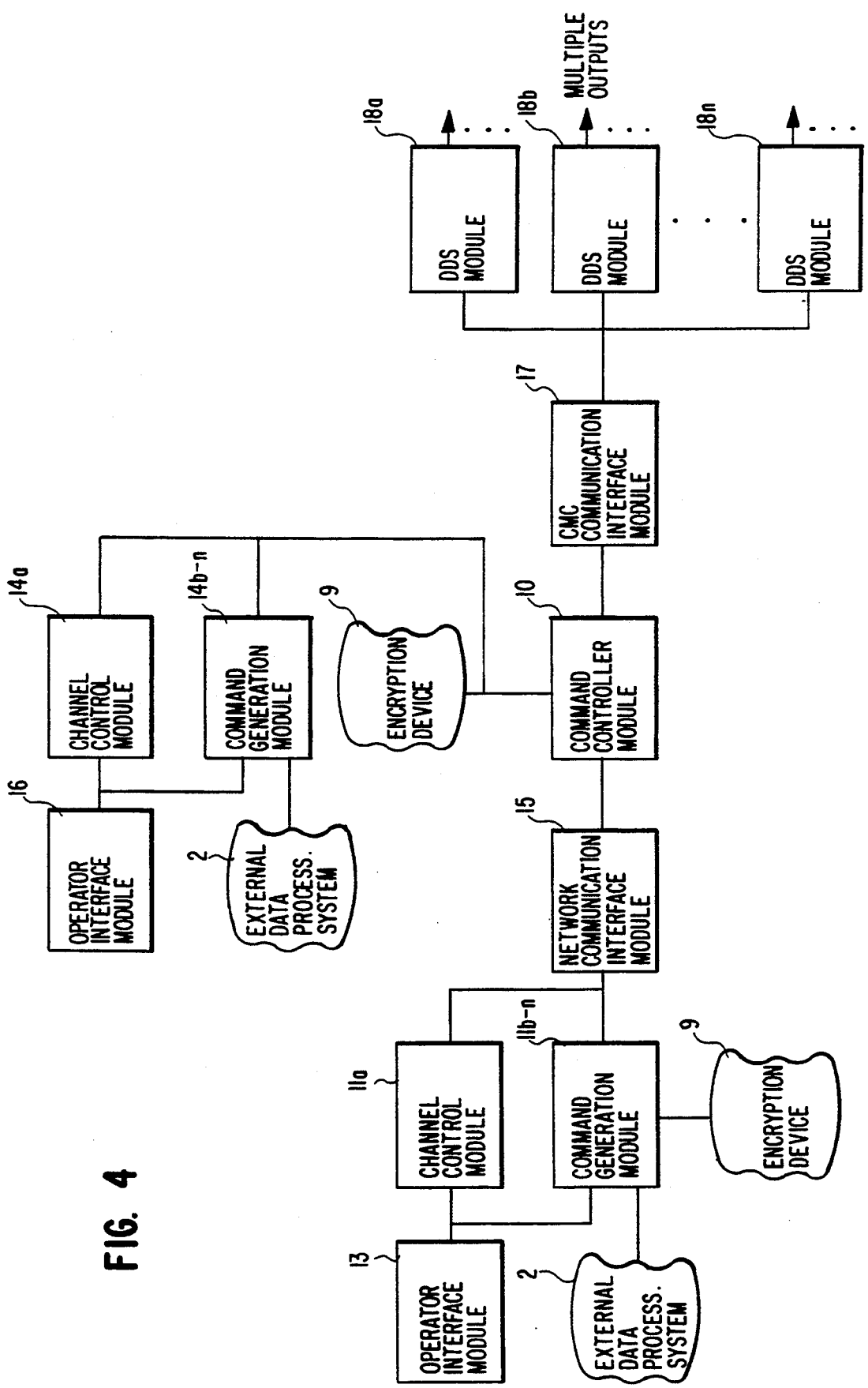
FIG. 4 is a diagram showing a basic software configuration of the command modulation system of this invention.

A basic hardware configuration of the preferred embodiment of the present invention, as shown in FIG. 3, comprises a local input device 6 such as a keyboard and video display terminal which is directly connected to a system controller 4 to provide local operator commanding capability, and a remote input device 3 of the same type which is connected to a remote system controller to provide remote commanding capability. The system controller accepts command information entered by the operator, generates the appropriate commanding sequences and channel assignment and configuration data, and sends them to the system controller 4 via a communications network 5, if remote, or via direct communication link, if local. The system controller 1 is also capable of computer controlled commanding based on command information input from an external data processing system 2.

The system controller 4 receives the command sequences and channel assignment and configuration data and passes it on to a set of command modulation channels (CMCs) 8a–8n via a CMC communications interface 7. Plural local and/or remote input devices, external data processor systems and system controllers may be provided, if desired. Each command modulation channel is capable of commanding different types of systems and of producing a single or multiple outputs to the same targeted system. Some targeted systems have the capability of operating in an encrypted commanding mode for security reasons, and an interface to an encryption device 9 is provided to support this mode of operation.

While a preferred embodiment includes the above-described modules arranged in the specific order shown in FIG. 3, the modules may be arranged in a plurality of different ways in order to adapt to specific system applications, e.g., as will be described later in conjunction with an expanded version of the command modulation system.

The various hardware components illustrated in FIG. 3 will now be described in more detail.

System controllers are used to provide commanding capability. For satellite commanding, the remote system controller would typically reside at the satellite control center. Command information is entered by an operator from a keyboard or other input device, or is prestored and passed by external processing system 2 to the system controller. The system controller generates command sequences and channel assignment and configuration data which correspond to the entered command, and sends it to the appropriate system controller 4 via communications network 5, if remote, or via direct communication link, if local. The basic system includes one input device and system controller. However, to allow for remote commanding capability, a typical system will have at least one remote input device and system controller in addition to a local input device and system controller.

A keyboard and video display terminal typically serve as the local or remote input devices 6 and 3, respectively, which allow an operator to input command information for the system under control. Locally, the input device 6 connects to the system controller 4. Remotely, the input device 3 connects to the system controller 1.

The communications network 5 provides the link between the remote system controller 1 and the local system controller 4. The communications network could be as simple as a direct interface link connecting a remote system controller to a local system controller. Alternatively, the communications network 5 could be as complex as a wide area network with the capability of allowing several remote system controllers to communicate to one or more local system controllers. Typically, a local area network is used for the communications network 5 when the commanding sources are multiple remote system controllers located in the same general area (e.g. a different pan of the same facility) as the local system controllers. A communications modem is sometimes used to provide commanding capability from a remote system controller.

The system controller 4 receives command information from the input device or external data processing system, and passes command sequences and channel assignment and configuration data to a set of command modulation channels (CMCs) 8a–8n via the CMC communications interface 7. The input device 6, system controller 4, CMC communications interface 7 and command modulation channels 8a–c may typically be implemented and housed in a single personal computer (PC). For satellite commanding, such a command modulation system will typically reside at earth stations that are geographically located to provide command transmission access to specific satellites.

The system controller 4 controls the CMCs 8a–8n by generating command sequences and channel assignment and configuration data necessary to configure the appropriate command modulation channels for the appropriate waveform generation format, and by passing such data along with the command sequences to the command modulation channels. Each command modulation channel may require a different waveform generation format, e.g., each satellite being accessed by a specific command modulation channel expects to receive command sequences in a certain format. By providing a plurality of command modulation channels, each capable of having a unique waveform generation format, it is possible to command a plurality of different satellites each expecting a unique waveform format. The functions of configuring the command modulation channels and providing command sequences are performed upon request from an operator at a local input device 6, or at a remote input device 3, or from an external data processing system 2.

The CMC communications interface 7 provides communications between the system controller 4 and the applicable set of command modulation channel(s) 8a–8n. It is typically implemented by dual access to shared blocks of memory between the system controller and the digital signal processors of the command modulation channels over an industry standard computer bus, e.g., a VME bus.

Each command modulation channel is an integrated module used for generating baseband command waveforms. Each unit consists of a digital signal processing (DSP) module, digital to analog converters (DACs) and output anti-aliasing filter stages. The command modulation channel generates the modulated commanding waveform according to the channel assignment and configuration data received from the system controller 4. Each command modulation channel 8a–8n is capable of commanding different types of systems and can produce a single or multiple outputs to the same targeted system, with multiple outputs typically used for redundancy purposes. For example, complex systems such as satellites are usually equipped with two redundant receivers for the targeted system. Command modulation channels used for such applications provide dual output capability to simultaneously generate waveforms for transmission to both receivers.

As a security measure to protect large satellite investments, uplink carriers are transmitted to the command receivers during non-commanding periods, including periods between command output sequences and between bits within a command sequence. This will prevent any interference or non-requested commanding to the satellites. The command modulation channels generate user-defined spreading waveforms during these periods to spread the carrier energy so as not to exceed the uplink power limitations established by the CCIR.

Some targeted systems have the capability of operating in an encrypted commanding mode for security reasons. In this case, an external encryption device 9 encrypts information as it passes through the system controller. Thus, unauthorized users cannot detect the information as it is transmitted to the targeted system or transmit unauthorized commands to the system. Further, each targeted system would have a corresponding decryptor in order to decrypt the received encrypted information.

SOFTWARE MODULES

The command modulation system according to the present invention includes a number of flexibly adapted software modules, as illustrated in FIG. 4 for the basic system configuration. Operator interface modules 13 and 16 run on the system controllers 1 and 4 and allow an operator to access, locally or remotely, the channel control and command generation functions of the system. Channel control modules 11a and 14a run on the system controller(s) 1 and 4, respectively, and allow for channel assignment and configuration for a specific targeted system in accordance with command information received from the operator interface modules 13 and 16 and the external data processor system(s). Configuration of a command modulation channel 8a–8n is done by selecting or modifying the appropriate modulation parameters for the targeted system, e.g., modulation mode, tone frequencies, tone amplitudes, and bit rate.

The command generation modules 11b and 14b also run on the system controller(s) 1 and 4, respectively, and generate commanding sequences in accordance with command information received from the operator interface modules 13 and 16 and the external data processing system(s). Command generation modules 11b–n and channel control module 11a perform the same respective functions as command generation modules 14b–n and channel control module 14a in response to command information received from the input devices and external data processing system(s). Command sequences and channel control data are passed to a command controller module 10 running on the local system controller 4, via network communications interface module 15 if remote or via direct communications link if local.

The command controller module 10 receives the command control data and command sequences, validates the requests, and passes them to an appropriate command modulation channel using a CMC communications interface module 17. ADDS (Direct Digital Synthesis) module 18a–18n running on each command modulation channel generates the modulated commanding waveform to be transmitted to the targeted system, based on the modulation parameters selected.

The various software modules illustrated in FIG. 4 will now be described in more detail.

Operator interface modules 13 and 16 provide the interface between the operator and the system via the input devices 3 and 6 of FIG. 3. The operator interface modules 13 and 16 respectively reside on the system controllers 1 and 4 of FIG. 3. The operator interface module allows an operator to access, locally or remotely, the channel control and command generation functions of the system. A generic operator interface module is provided as well as additional operator interface modules for each type of targeted system.

Each operator interface module is a shell that allows the operator to access the channel control module (11a, 14a) and the command generation module (11b–n, 14b–n). It is a collection of procedures used to build and control a main menu, sub-menus, dialog boxes, and function keys. To add a new type of target system, for example, the operator interface procedures are used to build a command generation dialog box for the new type of target system, define the appropriate actions (such as transmit command, execute command) as function keys, and give access to the dialog box by assigning it to a sub-menu.

The channel control modules 11a and 14a control the status and configuration of the command modulation channels 8a–8n of FIG. 3. These allow an operator to assign a command modulation channel to a specific targeted system by entering the system identification number, such as a spacecraft I.D. They also allow the operator to configure the command modulation channel tier that targeted system by selecting the appropriate waveform modulation parameters, such as modulation mode, carrier frequencies, amplitudes, and bit rate. The channel control modules 11a and 14a reside on the system controllers 1 and 4 of FIG. 3, respectively. Typically, in systems with local channel control capability, the local operator at the system controller can select which command modulation channels are allowed to be controlled by an external data processing system or a remote input device. An external data processing system or remote input device can then assign, configure.

and use (to command) only the command modulation channels that were granted control capability.

The command generation modules 11b-n and 14b-n receive command information from the operator interface modules 13 and 16 from the external data processing system(s) 2, to generate the command sequences in accordance with the received command information and in accordance with the manufacturer specifications of the targeted systems. The command sequences are normally different for each type of targeted system, and therefore a separate command generation module is provided for each type of targeted system. The command generation modules 14b-n reside on the system controller 4 of FIG. 3 where local (operator or computer controlled) commanding capability is desired, and command generation modules 11b-n reside on the system controller 1 of FIG. 3 where remote (operator or computer controlled) commanding capability is desired.

The network communications interface module 15 resides on the system controllers 1 and 4, and provides the interface between the system controllers. Command sequences and command control data are passed to the command controller module 10 using a network communication interface module 15 if remote or via direct communications link if local. The most commonly used interfaces are a direct asynchronous interface, a local area network interface, and a modem interface.

The command controller module 10 resides on the local system controller 4 and is responsible for the control of a set of command modulation channels based on the command control data received. The function or the command controller module 10 is to validate the command control data received from the command control modules 11a and 14a, route this data and the associated command sequences received from the command generator modules 11a-n and 14a-n to the appropriate command modulation channel via the CMC communications interface module 17, and send status information back to the input device or external data processing system from which the commanding originated. The format and content of the following messages are validated and the messages are then processed by command control module 10:

Modulation mode select: The modulation mode (such as Frequency Shift Keying (FSK) or Phase Shift Keying (PSK) and modulation parameters (such as tone frequencies, tone amplitudes and bit on-time arid off-time duration).

Data transmit: The commanding sequence to be transmitted to the target.

Execute: The execute tone or tones to be transmitted.

Data Transmit & Execute: The commanding sequence to be transmitted with an execute tone within the sequence.

Stop: A request to halt transmission or execution of a command sequence.

Transmission status: A request for status information operations performed by a channel.

The CMC communications interface module 17 provides the interface between the command controller module 10 and a DDS module (18a-18n) to be described later. This interface module 17 resides oil the system controller 4 of FIG. 3 and on the command modulation channels 8a-8n of FIG. 3.

When the system controller 4 wants to pass command control data and command sequences to a particular command modulation channel, it passes, via the CMC communications interface, the data and sequences ill a memory area shared by both the system controller 4 and that command modulation channel, then sets a flag for the command modulation channel to read the data and sequences. The command modulation channel receives the request, performs the operation, and puts any required status information in the shared memory area for the system controller 4 to read.

The DDS modules 18a-18n run on the digital signal processor of the command modulation channels 8a-8n of FIG. 3. Each DDS module uses the Direct Digital Synthesis (DDS) technique to generate, based on the selected modulation parameters, the modulated commanding waveforms to be transmitted to the targeted system. The DDS technique is a well-established discrete digital technique for generating arbitrary periodic waveforms. Since the DDS technique is implemented in software for the command modulation system of this invention, it allows for a fine resolution and a wide dynamic range for the waveform parameters, such as tone frequencies and amplitudes. Different modulation modes are provided as required to command the targeted systems. The most commonly used modes are Frequency Shift Keying (FSK) and Phase Shift Keying (PSK).

CHANNEL CONTROL OPERATIONS

The channel control function is provided to select and configure a channel for commanding a specific type of targeted system and to maintain the current status of all command modulation channels. When a local or remote operator selects the channel control option from the operator interface module, the status of all the command modulation channels 8a-8n of FIG. 3 are displayed. The operator can then select a channel and display its configuration. The channel configuration consists of the identification of the targeted system, the modulation mode, and the modulation parameters, such as tone frequencies, amplitudes, and bit rates.

The local operator interface modules 13 and 16 allow the operator to set up or modify the configuration of the channels by passing a request to the channel control module 11a or 14a of FIG. 4. This is done whenever a channel is selected to command a new type of targeted system. Control capabilities can also be granted to the external data processing system(s) 2 and remote input device 3 for any command modulation channel through the local operator interface module 16.

When the remote operator or an external data processing system needs to set up or modify the configuration of a channel, a request is sent from the channel control module 11a running on the remote system controller 1 of FIG. 3 to the command controller module 10 running on the system controller 4 of FIG. 3. If the channel is designated for remote operator or external data processing system control capability, the request is accepted and the remote operator or external processing system is allowed to configure the channel for a new targeted system. If the channel is not designated for such control, the request is denied.

If accepted, the request to modify the configuration of the channel is routed to the appropriate channel using the CMC communications interface module 17.

The DDS module, running on the command modulation channel, receives the command control data and modifies its configuration to be able to command the new targeted system.

COMMAND GENERATION OPERATIONS

Four modes of commanding are recognized by the command modulation system: local operator commanding, remote operator commanding, computer controlled commanding by an external data processing system, and encrypted mode commanding.

Local operator commanding is performed via a keyboard and a video display terminal directly connected to the system controller 4 of FIG. 3 by means of input device 6. After selecting a channel and setting it up for the targeted system, the appropriate operator interface for the targeted system is presented by the operator interface module to the operator, who then enters the required command information. Typical command information needed to generate the command sequences for a target satellite system are: spacecraft I.D., receiver I.D., decoder I.D., command number, and command data.

The command information is passed to the command generation module 14b-n pertinent to the type of targeted system to generate the command sequence. The command sequence is then passed to the command controller module 10, which routes it to the DDS module (one of 18a-18n) assigned to the targeted system via the CMC communications interface module 17. Feedback is given to the operator screen by the operator interface module 16 confirming that the command was passed successfully to the command modulation channel.

Remote operator commanding is performed in essentially the same manner as local operator commanding. The keyboard and video terminal display (designated as input device 3 in FIG. 3) are connected to the remote system controller 1. The command sequence generated on the system controller 1 is sent to the command controller module 10 on the system controller 4 of FIG. 3 via the network communications interface module 15 of FIG. 4. A feedback response is sent back from the command controller module 10 after passing the command sequence to the command modulation channel, thus providing an indication on the screen of the remote input device 3 that the command was transmitted.

Computer controlled commanding by an external data processing system 2 is performed without an operator. The autonomous triggering of the commands by the external data processing system is well-known and will thus not be described fully here. The channel to be controlled should already be designated for computer controlled commanding. This is done either by a local operator or as a system configuration start-up option.

The channel control module 11a or 14a on the system controller 1 or 4, respectively, of FIG. 3 receives the request from the external data processing system 2 to configure a channel for the type of targeted system. The request contains the selected channel number and the modulation parameters. The c module generates the channel assignment and configuration data and passes this data to the command controller module 10 via the network communications interface module 15 if remote, or via a direct communication link if local. The external data processing system can then pass the command requirements to the command generation module 11b-11n or 14b-14n specific to that type of targeted system. The command generation module generates the commanding sequence and sends it via network communications interface module 15, if remote, or via a direct communications link, if local, to the command controller module 10 on the local system controller 4. The command controller module 10 then passes the channel assignment and configuration data and the commanding sequence to the DDS module (one of 18a-18n) assigned to the targeted system via the CMC communications interface module 17 and sends a confirmation response back to the external data processing system from which commanding originated to confirm that the sequence has been sent to the DDS module.

Encrypted mode commanding is normally restricted to system controllers located in the same (secure) area as the encryptor, for security reasons. A command modulation system call support multiple sources for command encryption. The encryption mode is selected from the operator interface module 13 or 16 or by the external data processing system 2 on the system controller 1 or 4. In the encrypted mode, the command generation module (11b-n or 14b-n) for the specific type of targeted system generates the commanding sequence based on the command information passed frown either the operator interface module 13 or 16 or the external data processing system 2. The command generation module then passes the commanding sequence and an encryption request message to the encryption device 9 and gets back an encrypted commanding sequence which is then sent to the command controller module 10 to be transmitted by one of the DDS modules 18a-18n.

EXPANDED SYSTEM CONFIGURATION

The design flexibility of the command modulation system of the present invention can be appreciated from FIGS. 5 and 6 illustrating an expanded system configuration, with FIG. 5 illustrating an expanded hardware configuration and FIG. 6 illustrating an expanded software configuration. Each set of command modulation channels is controlled by a local system controller 4 via a CMC communications interface 7. Local commanding capabilities are provided to one of the system controllers via a local input device 6. In this specific example, the other system controller is not provided with local commanding capability for its set of command modulation channels. The system controllers 1, which could be located at remote locations, communicate with the system controllers 4 via a communications network 5. In this configuration, one of the system controllers 1 provides only operator commanding capability via a remote input device. Another system controller 1 provides only computer control commanding capability by interfacing to an external data processing system 2 that is supplying the command parameters. A third system controller 1 is shown with both operator and computer control commanding capabilities.

FIG. 6 shows the software configuration for the expanded command modulation system described above. The choice of software modules provided on the system controllers is based on the desired commanding capability of each of these locations.

Based on the above expanded system configuration description, it is clear that many different types of configurations can be used in order to provide a highly flexible system. Thus, the command modulation system of the present invention is capable of adapting to many new and future applications.

While preferred embodiments of the invention have been described above, it will be appreciated that various changes and modifications can be made to the disclosed system without departing from the scope of the invention as defined in the appended claims.

What is claimed is:

1. A command modulation system for generating modulated commands to a plurality of controlled systems, said command modulation system comprising:
   at least one input device for providing command input data;
   at least one command generation means for generating command information for said controlled systems in accordance with said command input data; and
   a plurality of command modulation channels for generating modulated command signals in accordance with said command input data for simultaneous transmission of said command information to respective ones of said controlled systems.

2. A command modulation system according to claim 1, wherein said command modulation signals are transmitted to said controlled systems in accordance with channel parameters associated with respective controlled systems, said command modulation system further comprising channel control means responsive to said command input data for controlling at least one of said channel parameters.

3. A command modulation system according to claim 1, wherein said system includes both local and remote input devices.

4. A command modulation system according to claim 1, wherein said remote input device includes an external data processing system.

5. A command modulation system according to claim 1, wherein said input device comprises an operator input device.

6. A command modulation system according to claim 1, wherein said input device comprises an external data processing system.

7. A command modulation system according to claim 5, further comprising an external data processing system as a second input device.

8. A command modulation system according to claim 2, wherein said channel control means controls at least one of a modulation mode, tone frequency, tone amplitude or bit rate used by said command modulation channels.

9. A command modulation system according to claim 2, wherein said channel control means includes means responsive to said input data for assigning at least one of said command modulation channels to a respective one of said controlled systems.

10. A command modulation system according to claim 1, wherein said command information comprises commanding sequences compatible with said controlled systems.

11. A command modulation system according to claim 1, wherein each said command modulation channel includes digital signal processing circuitry responsive to said command information for generating said modulated command signals.

12. A command modulation system according to claim 1, further including encryption means for encrypting said command information.

13. A command modulation system according to claim 1, wherein user defined spreading waveforms are sent along said command modulation channels during non-commanding periods.

14. A command modulation system according to claim 1, wherein said command generation means comprises at least one a software module whereby the command modulation system can be reconfigured to operate in conjunction with plural different types of controlled systems while using the same hardware for operation with each controlled system.

15. A command modulation system according to claim 1, wherein said input device comprises an operator input device using a first operator interlace software module associated with a first controlled system, whereby a second operator interface software module can be added to said system to facilitate operator input of command input data for a second controlled system.

* * * * *

UNITED STATES PATENT AND TRADEMARK OFFICE
CERTIFICATE OF CORRECTION

PATENT NO.  : 5,384,845
DATED       : Jan. 24, 1995
INVENTOR(S) : ANDREW J. LOPATIN, ANTOINE R. NAAMAN,
              JEAN-PIERRE G. BOURGON

It is certified that error(s) appears in the above-identified patent and that said Letters Patent is hereby corrected as shown below:

Column 6, line 22, delete "ADDS" and insert --A DDS--;

Column 7, line 48, delete "arid" and insert --and--;

Column 7, line 62, delete "oil" and insert --on--;

Column 7, line 68, delete "ill" and insert --in--

Column 9, line 57, after "The" delete "c" and insert --channel control--;

Column 10, line 21, delete "frown" and insert --from--.

Signed and Sealed this

Thirteenth Day of June, 1995

*Attest:*

BRUCE LEHMAN

*Attesting Officer*     *Commissioner of Patents and Trademarks*